United States Patent
Halper et al.

(10) Patent No.: US 9,681,193 B2
(45) Date of Patent: Jun. 13, 2017

(54) LOCALLY CONTROLLABLE INTERACTIVE GAME SYSTEM AND METHODS OF CREATING THE SAME

(71) Applicant: EchoStar Technologies L.L.C., Englewood, CO (US)

(72) Inventors: Brandon Richard Halper, Sheridan, CO (US); Lawrence Moran, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 13 days.

(21) Appl. No.: 14/498,813

(22) Filed: Sep. 26, 2014

(65) Prior Publication Data

US 2016/0094885 A1    Mar. 31, 2016

(51) Int. Cl.

| | |
|---|---|
| *H04N 7/173* | (2011.01) |
| *A63F 9/24* | (2006.01) |
| *A63F 13/00* | (2014.01) |
| *G06F 17/00* | (2006.01) |
| *G06F 19/00* | (2011.01) |
| *H04N 21/478* | (2011.01) |
| *H04N 21/41* | (2011.01) |
| *H04N 21/433* | (2011.01) |
| *H04N 21/436* | (2011.01) |
| *H04N 21/462* | (2011.01) |
| *H04N 21/61* | (2011.01) |

(52) U.S. Cl.
CPC ..... *H04N 21/4781* (2013.01); *H04N 21/4122* (2013.01); *H04N 21/4331* (2013.01); *H04N 21/43615* (2013.01); *H04N 21/4622* (2013.01); *H04N 21/6125* (2013.01)

(58) Field of Classification Search
USPC ...................................... 463/40–42
See application file for complete search history.

(56) References Cited

U.S. PATENT DOCUMENTS

| | | | |
|---|---|---|---|
| 4,856,787 A * | 8/1989 | Itkis | G07F 17/32 273/237 |
| 5,618,045 A * | 4/1997 | Kagan | A63F 13/12 463/40 |
| 7,938,727 B1 * | 5/2011 | Konkle | A63F 13/12 273/454 |
| 8,944,922 B2 * | 2/2015 | Westerberg | H04M 1/72544 463/40 |

(Continued)

*Primary Examiner* — Mushfikh Alam
(74) *Attorney, Agent, or Firm* — Seed IP Law Group LLP (57) ABSTRACT

Various embodiments facilitate multi-user gaming. In one embodiment, a locally controllable interactive game system is provided to support a plurality of users within a single household. The locally controllable interactive game system includes a host and a plurality of thin clients. The host and the plurality of thin clients allow respective users to play video games independently or together for multi-player video games. The host is coupled to a plurality of video game content providers by a world wide web. In one embodiment, the host consolidates video game content from the plurality of video game content providers. The plurality of thin clients is coupled to the host by a local area network. In one embodiment, each thin client obtains user video game content from the host and utilizes the user video game content to provide a video game to a respective user.

15 Claims, 7 Drawing Sheets

(56) References Cited

U.S. PATENT DOCUMENTS

| | | | | |
|---|---|---|---|---|
| 9,055,309 B2* | 6/2015 | Neumeier | ......... | H04N 5/44591 |
| 2003/0104865 A1* | 6/2003 | Itkis | ......... | G07F 17/32 463/39 |
| 2004/0097288 A1* | 5/2004 | Sloate | ......... | A63F 13/12 463/42 |
| 2005/0026695 A1* | 2/2005 | Tsuchiyama | ......... | A63F 13/12 463/42 |
| 2005/0026697 A1* | 2/2005 | Balahura | ......... | A63F 13/12 463/42 |
| 2006/0135230 A1* | 6/2006 | Godse | ......... | A63F 13/12 463/1 |
| 2007/0066490 A1* | 3/2007 | Gemelos | ......... | A63F 13/12 505/100 |
| 2007/0099704 A1* | 5/2007 | Liu | ......... | A63F 13/12 463/42 |
| 2009/0075724 A1* | 3/2009 | Breeding | ......... | G07F 17/3276 463/25 |
| 2009/0150938 A1* | 6/2009 | Clancy | ......... | H04N 5/765 725/47 |
| 2013/0007499 A1* | 1/2013 | Moy | ......... | G06F 3/1423 713/400 |
| 2013/0305292 A1* | 11/2013 | Chen | ......... | H04N 21/472 725/54 |
| 2014/0094272 A1* | 4/2014 | Kelly | ......... | G07F 17/3225 463/25 |
| 2015/0050993 A1* | 2/2015 | Blayer | ......... | H04L 51/046 463/31 |
| 2015/0172760 A1* | 6/2015 | AbiEzzi | ......... | H04N 21/4437 725/39 |
| 2015/0188761 A1* | 7/2015 | Chuang | ......... | H04L 12/2816 715/734 |
| 2016/0086442 A1* | 3/2016 | Hilbert | ......... | G07F 17/3239 463/16 |

* cited by examiner

LOCALLY CONTROLLABLE INTERACTIVE GAME SYSTEM AND METHODS OF CREATING THE SAME

TECHNICAL FIELD

This disclosure relates to a locally controllable interactive game system and methods of creating the same.

BACKGROUND

As online video games become more popular, there are more users within the same household that desire to play online video games. Most household multi-user gaming systems require either each user to have their own gaming console or all users to share a single gaming console. As such, users within the same household must either purchase multiple gaming consoles or play in the same room to share a single gaming console. This either results in high user costs or a poor gaming experience.

In addition, Internet bandwidth is becoming a precious commodity for households as gaming bandwidth requirements and Internet service provider's prices increase. Most household multi-user gaming systems require each gaming console to have their own respective Internet connection. As such, as the number of users within the same household increase, the number of gaming systems and Internet connections will increase. This results in higher demands for Internet bandwidth and possibly slower gaming performance.

BRIEF SUMMARY

According to one embodiment, a locally controllable interactive game system is provided to support multi-user gaming. The locally controllable interactive game system utilizes a single host and a single Internet connection. The locally controllable interactive game system includes a host and a plurality of thin clients. The host and the plurality of thin clients allow respective users to play video games independently or together for multi-player video games.

The host is connected to a world wide web and consolidates video game content from a plurality of video game content providers. The host may stream the video game content or may store the video game content locally for faster performance. The host may also provide video game content directly to a user.

Each of the plurality of thin clients obtains video game content from the host and provides the video game content to respective users. The plurality of thin clients are connected to the host locally and do not require an Internet connection. For example, the host and the plurality of thin clients may be connected to each other through a local area network that includes coaxial cable.

In another embodiment, the host conserves Internet bandwidth by obtaining video game content from a world wide web only when necessary. For example, the host may determine whether required video game content is locally stored in a video game content database and provide the locally stored video game content to the plurality of thin clients when possible.

The locally controllable interactive game system results in a multi-user gaming system with lower Internet bandwidth demands and faster gaming performance.

DETAILED DESCRIPTION

A. Overview

Figure 1:
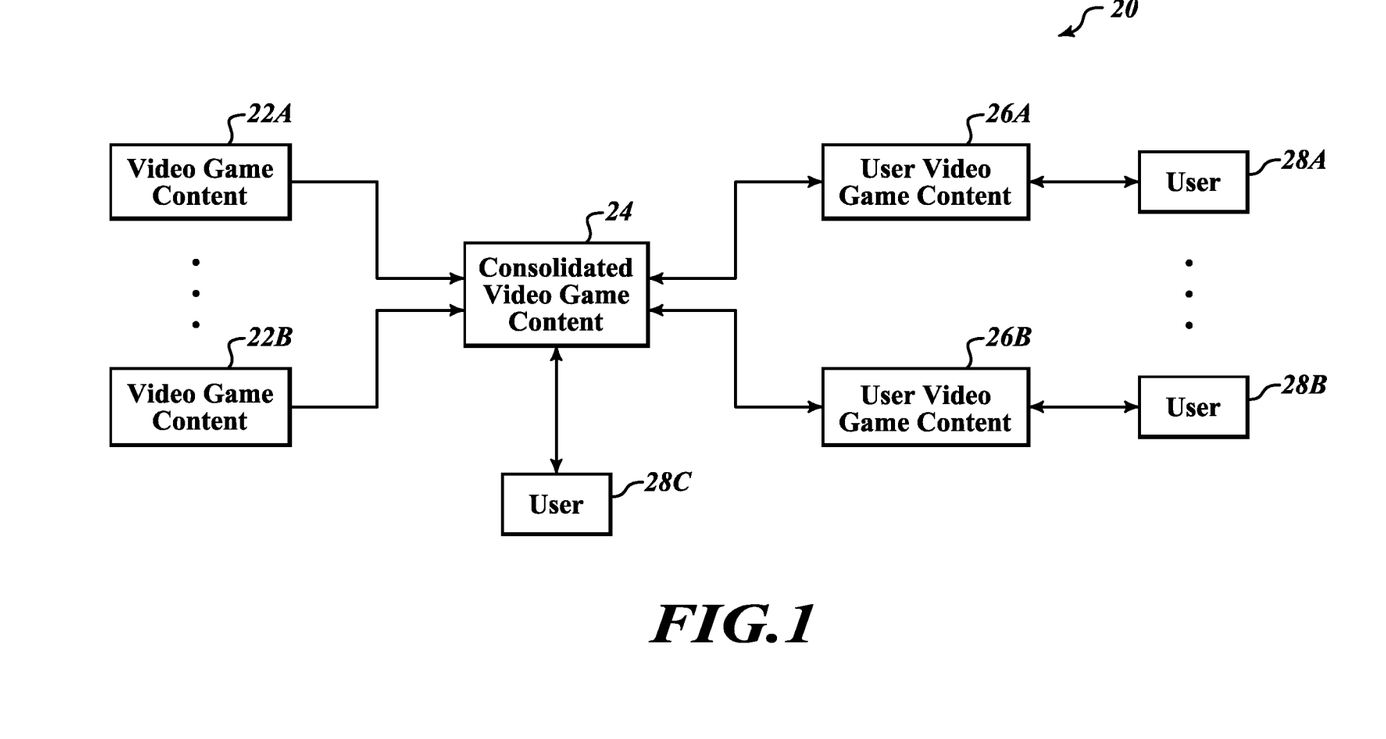
FIG. 1 is an overview block diagram illustrating an example of data flow for a locally controllable interactive game environment according to one embodiment as disclosed herein.

FIG. 1 is an overview block diagram illustrating an example of data flow for a locally controllable interactive game environment 20 according to principles disclosed herein. In this example, the locally controllable interactive game environment 20 includes video game content 22, consolidated video game content 24, user video game content 26, and users 28.

The video game content 22 includes information used to provide video games. For example, the video game content 22 may include programming data to create video games, configuration data for video games, coordination data for a multiplayer video games, and media for video games. The video game content 22 may be for a single video game or for a plurality of video games. As will be discussed in detail with respect to FIG. 2, the video game content 22 may be provided by a single video game content provider or a plurality of video game content providers. It should be noted that, although only the video game content 22A and the video game content 22B are shown in FIG. 1, the locally controllable interactive game system 20 may include any number of video game content.

The consolidated video game content 24 is a compilation of the video game content 22. The consolidated video game content 24 may be for a single video game or for a plurality of video games. As will be discussed in detail with respect to FIGS. 2 and 5, the consolidated video game content 24 is compiled by a host.

The user video game content 26 provides video game content for particular users and may be a portion of or the entire consolidated video game content 24. In one embodiment, the user video game content 26A provides video game content for a first video game and the user video game content 26B provides video game content for a second video game. In another embodiment, the user video game content 26A and the user video game content 26B provides video game content for a multiplayer video game. As will be discussed in detail with respect to FIGS. 2 and 5, the user video game content 26 are obtained by thin clients. It should be noted that, although only the user video game content 26A and the user video game content 26B are shown in FIG. 1, the locally controllable interactive game system 20 may include any number of user video game content.

In another embodiment, the user video game content 26 interacts with the consolidated video game content 24. For example, the consolidated video game content 24 may be updated to include a portion of or the entire user video game content 26A. As will be discussed in detail with respect to FIG. 2, this allows user video game content to be shared within the locally controllable interactive game environment 20.

The user 28A and the user 28B are provided respective user video game content that the each user may interact with. For example, the user video game content 26A may be used to provide a first video game for the user 28A, and the user video game content 26B may be used to provide a second video game for the user 28B. As will be discussed in detail with respect to FIG. 2, the user video game content 26 is displayed to the users 28 through respective televisions ("TV"). It should be noted that, although only the user 28A and the user 28B are shown in FIG. 1, the locally controllable interactive game environment 20 may include any number of users.

The user 28C directly interacts with the consolidated video game content 24 or a portion thereof. For example, a portion of the consolidated video game content 24 may be used to provide a video game for the user 28C. As will be discussed in detail with respect to FIG. 2, the consolidated video game content 24 or a portion thereof is displayed to the user 28C through a TV.

B. Example Locally Controllable Interactive Game System

Figure 2:
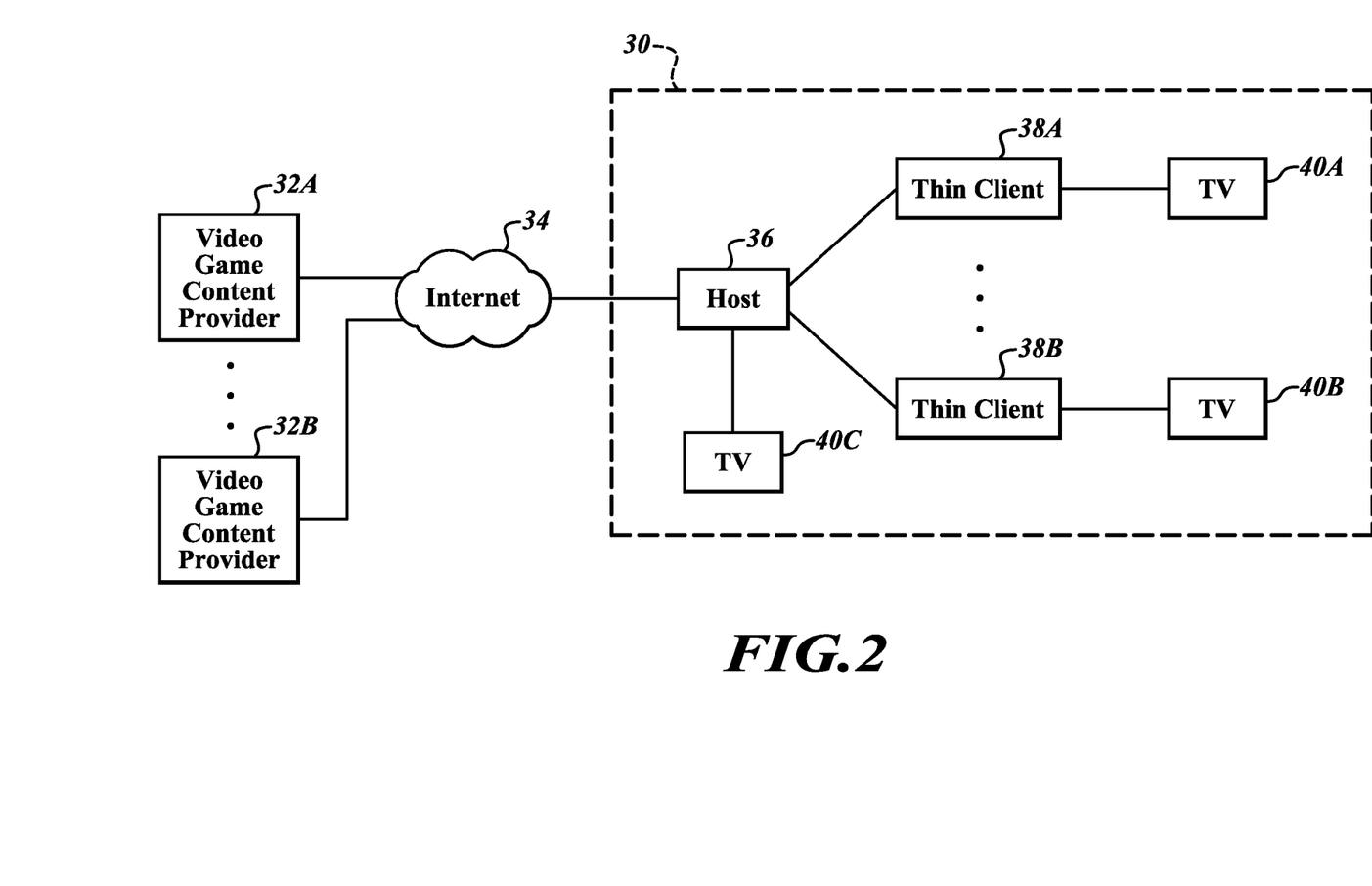
FIG. 2 is a block diagram illustrating an example of a locally controllable interactive game system according to one embodiment as disclosed herein.

FIG. 2 is a block diagram illustrating an example of a locally controllable interactive game system 30 according to principles disclosed herein. In this example, the locally controllable interactive game system 30 includes a host 36, thin clients 38, and TVs 40. The locally controllable interactive game system 30 is coupled to video game content providers 32.

The video game content providers 32 are coupled to the host 36. The video game content providers 32 are vendors that provide video game content. As discussed with respect to FIG. 1, video game content includes information used to provide video games. The video game content providers 32 and the host 36 are coupled to each other through a world wide web, such as the Internet 34. It should be noted that, although only the video game content provider 32A and the video game content provider 32B are shown in FIG. 2, the locally controllable interactive game system 30 may include any number of video game content providers.

The host 36 is configured to consolidate video game content from the video game content providers 32. For example, the host 36 may compile the consolidated the video game content 24 from the video game content providers 32 periodically, upon notification of video game content being updated, or on-demand. This results in video game content being compiled at a single physical location, such as a room of a household. In another embodiment the host 36 may act as an intermediary to facilitate communication between the thin clients 38. For example, the host 36 may obtain the user video game content 26A from the thin client 38A and forward the user video game content 26A to the thin client 38B.

The thin clients 38 are coupled to the host 36. In one embodiment, the thin clients 38 and the host 36 are coupled to each other through a local area network. For example, the local area network may be built using coaxial cable, Ethernet, or Wi-Fi. The thin clients 38 are configured to obtain user video game content from the host 36. For example, the thin client 38A and the thin client 38B may obtain the user video game content 26A and the user video game content 26B, respectively from the host 36. The thin clients 28 may obtain user video game content from the host 36 periodically, upon notification of consolidated video game content being updated, or on-demand. In one embodiment, each of the thin clients 38 is located at separate physical locations. For example, the thin client 38A may be located in a separate room of a household from the thin client 38B. It should be noted that, although only the thin client 38A and the thin client 38B are shown in FIG. 2, the locally controllable interactive game system 30 may include any number of thin clients.

The TVs 40 are coupled to the thin clients 38 and the host 36. Particularly, the TV 40A, the TV 40B, and the TV 40C are coupled to the thin client 38A, the thin client 38B, and the host 36, respectively. The TVs 40 are configured to provide user video game content to respective users by displaying video games provided by the user video game content. For example, in one embodiment, the thin client 38A may display a first video game on the TV 40A for the user 28A, the thin client 38B may display a second video game on the TV 40B for the user 28B, and the host 36 may display a third video game on the TV 40C for the user 28C. In another embodiment, the thin client 38A, the thin client 38B, and the host 36 may display a multiplayer video game on the TV 40A, the TV 40B, and the TV 40C, respectively.

As will be discussed in detail with respect to FIG. 3 and FIG. 4, the thin client 38A, the thin client 38B, and the host 36 may be coupled to respective peripherals and remote controls.

Figure 3:
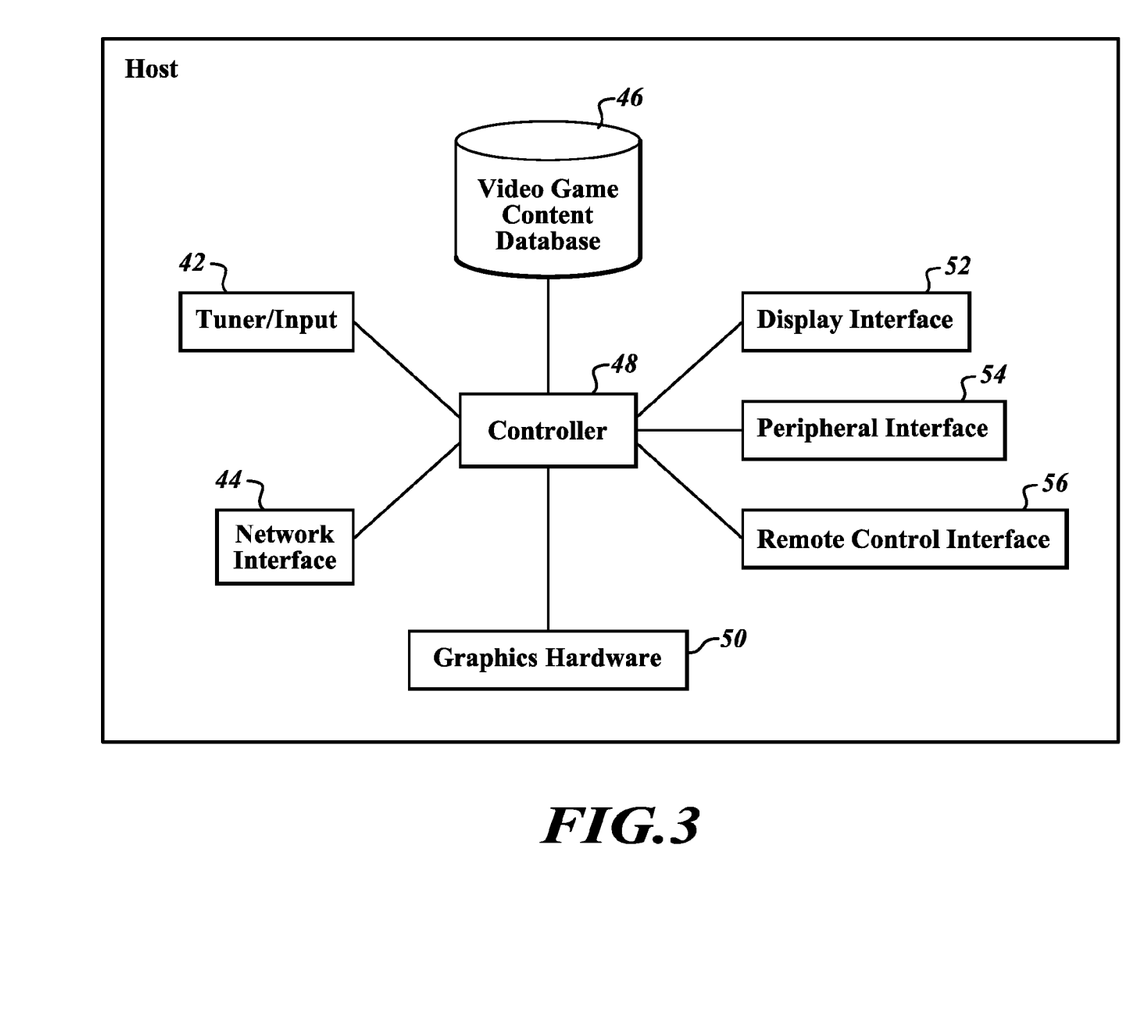
FIG. 3 is a schematic illustrating an example of a host of a locally controllable interactive game system according to one embodiment as disclosed herein.

FIG. 3 is a schematic illustrating an example of a host, such as the host 36 of the locally controllable interactive game system 30, according to principles disclosed herein. In this example, a host includes a tuner/input 42, a network interface 44, a video game content database 46, a controller 48, graphics hardware 50, a display interface 52, a peripheral interface 54, and a remote control interface 56.

The tuner/input 42 is configured to send and receive data, such as media signals and video game content. For example, the tuner/input 42 may be coupled to a satellite receiving antenna to receive a television signal, and may be coupled to the thin clients 38 to send and receive the user video game content 26.

The network interface 44 is configured to send and receive data from a world wide web. For example, the network interface 44 may be connected the Internet 34 to obtain the video game content 22 from the video game content providers 32.

The video game content database 46 is configured to store video game content. For example, the video game content database 46 may store the consolidated video game content 24 that was compiled from the video game content providers 32.

The controller 48 is configured to manage the functions of the host 36. For example, the controller 48 may determine what video game content is needed; determine the location of video game content providers; determine whether required video game content is stored in the video game content database 46; coordinate the compilation of consolidated video game content; provide user video game content to users; and control the graphics hardware 50, the display interface 52, the peripheral interface 54, and the remote control interface 56.

The graphics hardware 50 is configured to create video games from video game content. For example, the graphics hardware 50 may use a portion of the consolidated video game content 24 to generate graphics for a video game to be displayed on the TV 40C.

The display interface 52, the peripheral interface 54, and the remote control interface 56 are configured to couple various devices to a host. For instance, the display interface 52 may couple the TV 40C to the host 36, the peripheral interface 54 may couple peripherals to the host 36, and the remote control interface 56 may couple a remote control to the host 36. Peripherals may include game controllers, microphones, speakers, cameras, motion sensing devices, or the like.

Figure 4:
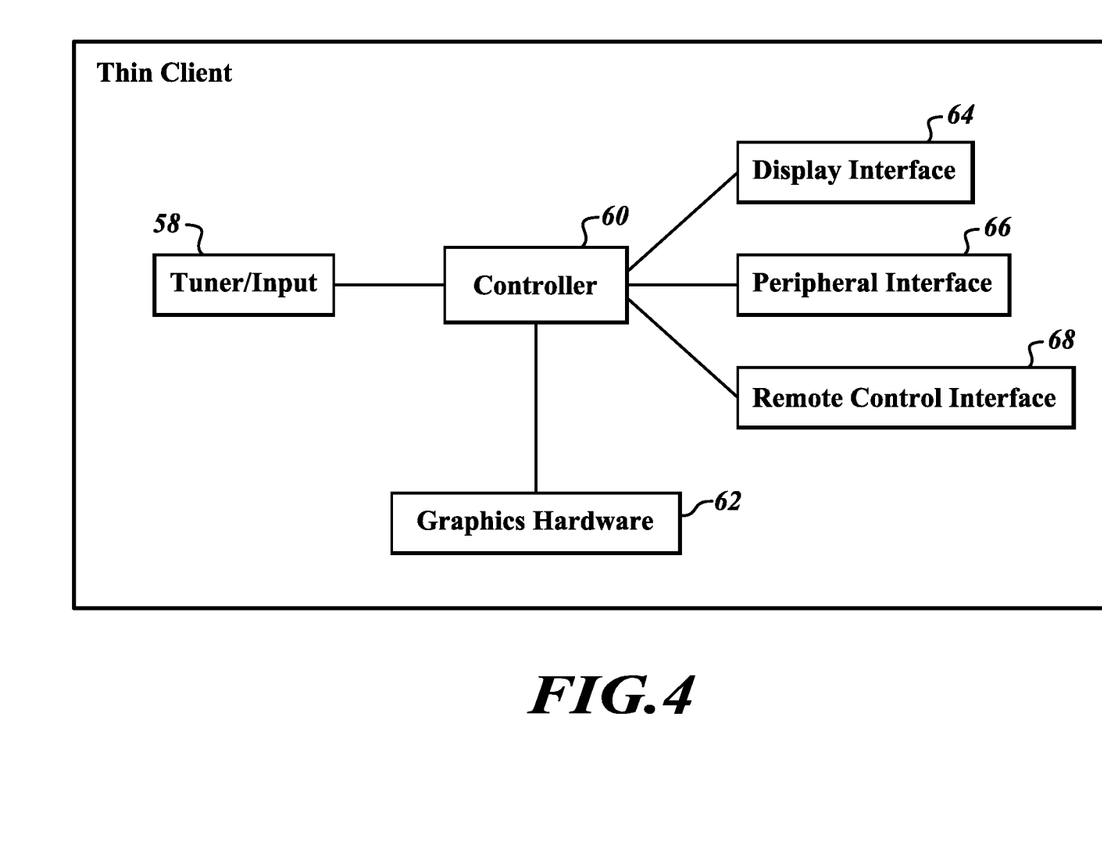
FIG. 4 is a schematic illustrating an example of a thin client of a locally controllable interactive game system according to one embodiment as disclosed herein.

FIG. 4 is a schematic illustrating an example of a thin client, such as the thin client 38A of the locally controllable interactive game system 30, according to principles disclosed herein. A thin client is similar to a host, except that a thin client's functionality may be limited. For example, a thin client may not include a video game content database or a network interface. In this example, a thin client includes tuner/input 58, a controller 60, graphics hardware 62, a display interface 64, a peripheral interface 66, and a remote control interface 68. The tuner/input 58, the controller 60, the graphics hardware 62, the display interface 64, the peripheral interface 66, and the remote control interface 68 have substantially the same functionality as the tuner/input 42, the controller 48, the graphics hardware 50, the display interface 52, the peripheral interface 54, and the remote control interface 56, respectively. In addition, as will be discussed in detail with respect to FIGS. 5-7, a thin client depends on a host to perform its own function. The limited functionality of thin clients results in lower costs.

It should be noted that each block shown in FIGS. 1-4 may represent one or more such blocks as appropriate to a specific embodiment or may be combined with other blocks.

It should also be noted that the host 36 and the thin clients 38 may be any suitable electronic device that is operable to receive and transmit data. The host 36 and the thin clients 38 may be interchangeably referred to as a "TV converter," "receiving device," "set-top box," "TV receiving device," "TV receiver," "TV recording device," "satellite set-top box," "satellite receiver," "cable set-top box," "cable receiver," "media player," and/or "TV tuner."

In another embodiment, the TVs 40 may be replaced by other presentation devices. Examples include a virtual headset, a monitor, or the like. In many implementations, one or more presentation devices reside in or near the users' 28 premises and are communicatively coupled to the host 36 and the thin clients 38. Further, the host 36 and a presentation device may be integrated into a single device. Similarly, the thin clients 38 and presentation devices may be integrated into respective single devices. Such a single device may have the above-described functionality of the host 36, the thin clients 38, and the TVs 40, or may even have additional functionality.

In another embodiment, the Internet 34 may be replaced by other types of communication media, now known or later developed. Non-limiting media examples include telephony systems, cable systems, fiber optic systems, microwave systems, asynchronous transfer mode ("ATM") systems, frame relay systems, digital subscriber line ("DSL") systems, radio frequency ("RF") systems, and satellite systems.

Figure 5:
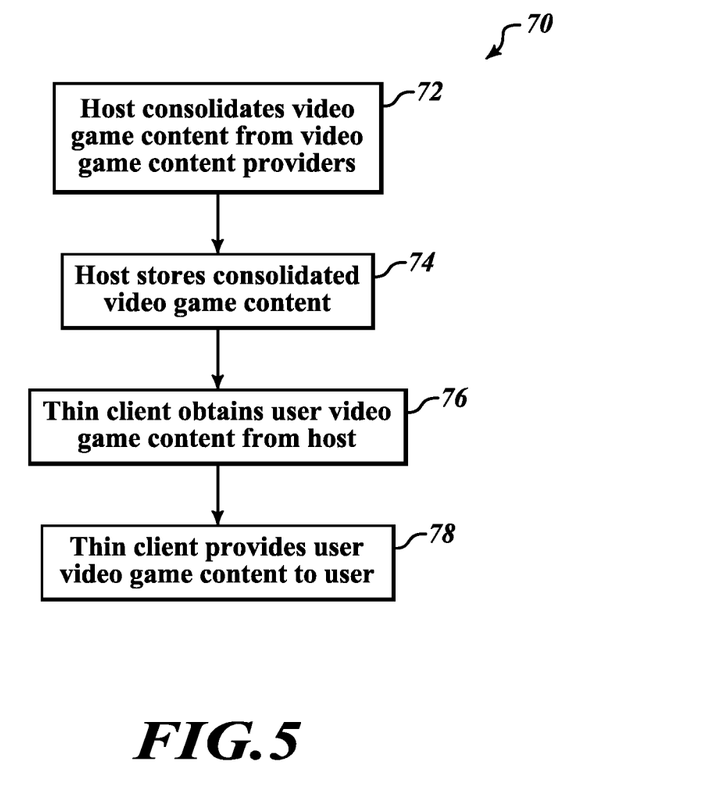
FIG. 5 is a flow diagram illustrating an example of a video game content consolidation process for a locally controllable interactive game system according to one embodiment as disclosed herein.

C. Example Video Game Content Consolidation Process for a Locally Controllable Interactive Game System FIG. 5 is a flow diagram illustrating an example of a video game content consolidation process 70 for the locally controllable interactive game system 30 according to principles disclosed herein.

At a first part of the sequence 72, a host consolidates video game content from a plurality of video game content providers to form consolidated video game content. For example, the host 36 may consolidate the video game content 22 from the video game content providers 32 by gathering and packaging the video game content 22 at a single location, such as a household. The host 36 may obtain the video game content 22 by the video game content providers 32 pushing the video game content 22 to the host 36, or by the host 36 pulling the video game content 22 from the video game content providers 32. Step 72 may be performed periodically, upon notification of video game content being updated, or on-demand.

In a subsequent step 74, the host stores the consolidated video game content in a video game content database. For example, the host 36 may store the consolidated video game content 24 in the video game content database 46. This allows the consolidated video game content 24 to be buffered for future use. In another embodiment, the consolidated video game content 24 is not stored in the video game content database 46. Rather, the host 36 streams the consolidated video game content 24 to the thin clients 38 as needed.

In step 76, a plurality of thin clients obtains respective user video game content from the host. For example, the thin client 38A may obtain the user video game content 26A from the host 36 for the user 28A, and the thin client 38B may obtain the user video game content 26B from the host 36 for the user 28B. Similar to step 72, the thin clients 38 may obtain the user video game content 26 from the host 36 by a push or pull method. Step 76 may be performed periodically, upon notification of consolidated video game content being updated, or on-demand.

In step 78, each of the thin clients provides respective user video game content to respective users. For example, the thin client 38A may provide the user video game content 26A to the user 28A by displaying a video game provided by the user video game content 26A on TV 40A, and the thin client 38B may provide the user video game content 26B to the user 28B by displaying a video game provided by the user video game content 26B on TV 40B.

Figure 6:
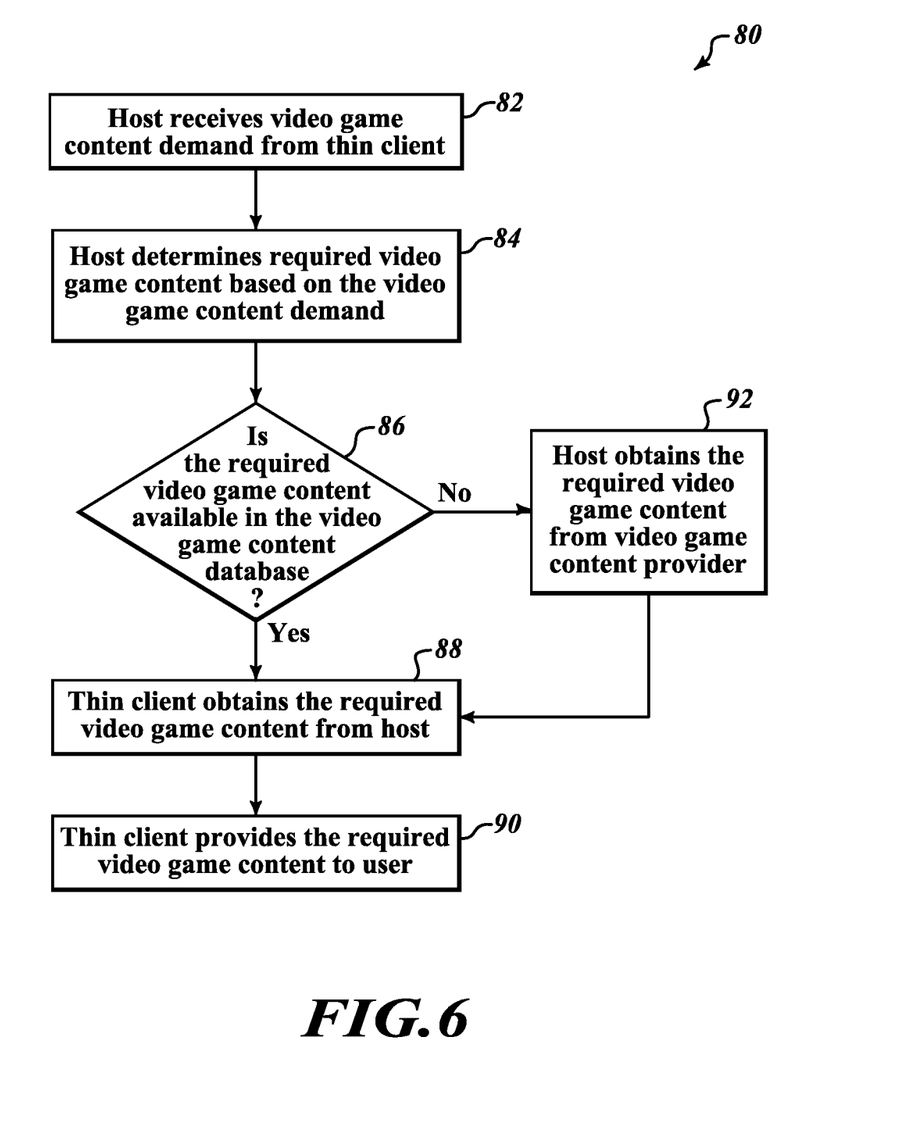
FIG. 6 is a flow diagram illustrating an example of a video game content demand process for a locally controllable interactive game system according to one embodiment as disclosed herein.

D. Example Video Game Content Demand Processes for a Locally Controllable Interactive Game System FIG. 6 is a flow diagram illustrating an example of a video game content demand process 80 for the locally controllable interactive game system 30 according to principles disclosed herein.

At a first part of the sequence 82, a host receives a video game content demand from a thin client. For example, the thin client 38A may send a video game content demand to the host 36 to request additional user video game content for user 28A. In another embodiment, the host 36 does not receive a video game content demand from a thin client.

Instead, in step 82, the host 36 determines whether any user video game content is needed for any of the thin clients 38.

In a subsequent step 84, the host determines required video game content based on the video game content demand received in step 82. That is, the host determines what video game content is needed to satisfy the video game content demand. For example, the video game content demand may be requesting video game content for a new video game that a user has selected, and the host 36 may determine what video game content is needed to provide the new video game.

In step 86, the host determines whether the required video game content from step 84 is available in a video game content database. For example, the host 36 may determine whether the required video game content is stored in the video game content database 46 from a previous video game content consolidation process. If the host determines that the required video game content is available in the video game content database, the video game content demand process 80 moves to step 88. If the host determines that the required video game content is not available in the video game content database, the video game content demand process 80 moves to step 92. Step 86 prevents the host from connecting to a world wide web and obtaining additional video game content from video game content providers unnecessarily. Thus, conserving Internet bandwidth and increasing gaming performance.

In step 88, the thin client from step 82 obtains the required video game content from the host when the required video game content is available in the video game content database. For example, the thin client 38A may obtain the required user video game content from the host 36 for user 28A. As discussed with respect to FIG. 5, the thin client 38A may obtain the required video game content from the host 36 by a push or pull method.

In step 90, the thin client from steps 82 and 88 provide the required video game content to a respective user. For example, the thin client 38A may provide the required video game content to the user 28A by displaying a video game provided by the required video game content on the TV 40A.

In step 92, the host obtains the required video game content from at least one video game content provider. For example, the host 36 may determine which of the video game content providers 32 have the required video game content and then obtain the required video game content from the appropriate video game content provider(s). As discussed with respect to FIG. 5, the host 36 may obtain the required video game content from the video game content providers 32 by a push or pull method. The video game content demand process 80 then moves to step 88.

In an illustrating example of the video game content demand process 80, in step 82, the user 28A makes a selection to start a new video game by using the thin client 38A. Accordingly, the thin client 38A sends a video game content demand to the host 36. In steps 84 and 86, the host 36 determines what video game content is required for the video game content demand and whether the required video game content is already stored in the video game content database 46, respectively. If the required video game content is in the video game content database 46, the host 36 provides the required video game content directly to the thin client 38A. If the required the video game content is not in the video game content database 46, the host 36 will obtain the required video game content from at least one of the video game content providers 32 and then provide the required video game content to the thin client 38A. The thin client 38A then utilizes the required video game content to display the new video game to the user 28A on the TV 40A.

Figure 7:
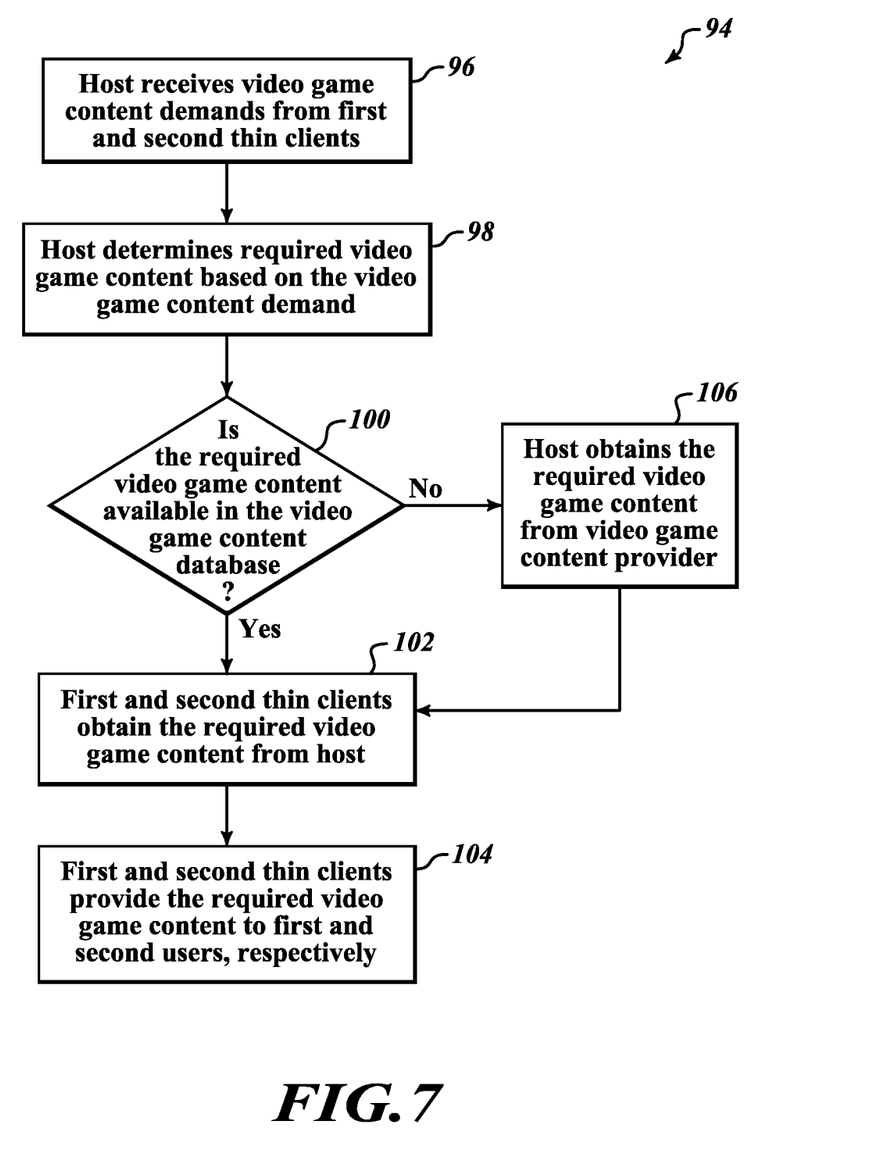
FIG. 7 is a flow diagram illustrating an example of a multiplayer video game content demand process for a locally controllable interactive game system according to one embodiment as disclosed herein.

FIG. 7 is a flow diagram illustrating an example of a multiplayer video game content demand process 94 for the locally controllable interactive game system 30 according to principles disclosed herein.

At a first part of the sequence 96, a host receives video game content demands from first and second thin clients. For example, the thin client 38A and the thin client 38B may both send video game content demands to the host 36 to request additional user video game content for the user 28A and the user 28B, respectively. In another embodiment, the host 36 does not receive a video game content demand from thin clients. Instead, in step 96, the host 36 determines whether any user video game content is needed for any of the thin clients 38.

In a subsequent step 98, the host determines required video game content based on the video game content demands. For example, the host 36 determines what video game content is needed to satisfy video game content demands from the thin client 38A and the thin client 38B. For instance, the thin client 38A and the thin client 38B may each be requesting video game content for a new multiplayer video game that the user 28A and the user 28B have selected, respectively, and the host 36 may determine what video game content is needed to provide the new multiplayer video game.

In step 100, the host determines whether the required video game content is available in a video game content database. For example, the host 36 may determine whether the required video game content is already stored in the video game content database 46 from a previous video game content consolidation process 70. If the host determines that the required video game content is available in the video game content database, the multiplayer video game content demand process 94 moves to step 102. If the host determines that the required video game content is not available in the video game content database, the multiplayer video game content demand process 94 moves to step 106. Step 100 prevents a host from connecting to a world wide web and obtaining additional video game content from video game content providers unnecessarily. Thus, conserving Internet bandwidth and increasing gaming performance.

In step 102, the first and second thin clients obtain the required video game content from the host when the required video game content is available in the video game content database. For example, the thin client 38A and the thin client 38B obtain the required user video game from the video game content database 46 of the host 36. As discussed with respect to FIG. 5, the thin client 38A and the thin client 38B may obtain the required video game content from the host 36 by a push or pull method.

In step 104, the first and second thin clients provide the required video game content to their respective users. For example, the thin client 38A may provide the required video game content to the user 28A by displaying the multiplayer video game on the TV 40A, and the thin client 38B may provide the required video game content to the user 28B by displaying the multiplayer video game on the TV 40B.

In step 106, the host obtains the required video game content from at least one video game content provider. For example, the host 36 may determine which of the video game content providers 32 have the required video game content and then obtain the required video game content from the appropriate video game content provider(s). As discussed with respect to FIG. 5, the host 36 may obtain the required video game content from at least one of the video game content providers 32 by a push or pull method. The video game content demand process 94 then moves to step 102.

It should be noted that the use of the first and second thin clients in the multiplayer video game content demand process 94 are only for illustrative purposes. The multiplayer video game content demand process 94 may be applied to any number of thin clients.

In an illustrating example of the multiplayer video game content demand process 94, in step 96, the user 28A and the user 28B both make a selection to start a multiplayer video game. Accordingly, the thin client 38A and the thin client 38B send video game content demands to the host 36. In steps 98 and 100, the host 36 determines what video game content is required for the video game content demands and whether the required video game content is already stored in the video game content database 46, respectively. If the required video game content is in the video game content database 46, the host 36 provides the required video game content directly to the thin client 38A and the thin client 38B. If the required the video game content is not in the video game content database 46, the host 36 will obtain the required video game content from at least one of the video game content providers 32 and then provide the required video game content to the thin client 38A and the thin client 38B. The thin client 38A and the thin client 38B then utilize the required video game content to display the multiplayer video game to the user 28A through the TV 40A and to the user 28B through the TV 40B, respectively.

It should be noted that, although FIGS. 1-7 are directed towards video game content, the principles disclosed herein may be applied to other types of content, such as application content, Internet content, and media content. For example, the host 36 may consolidate application content from a plurality of application content providers, and the thin clients 28 may obtain respective user application content from the host 36. The thin clients 28 may then utilize respective user application content to provide applications to respective users. Application content may include programming data to provide applications, configuration data for applications, and coordination data for shared applications. Internet content may include programming and configuration data for websites. Media content may include media data to provide media, such as television shows, movies, pictures, and audio.

The invention claimed is:

1. A method comprising:
obtaining, by a set-top box, video game content from a plurality of remote video game content providers, the set-top box being located in a first room of a household;
storing, by the set-top box, the video game content from the plurality of remote video game content providers in a video game content database of the set-top box;
receiving, at the set-top box and from a first thin client, a request to establish a multiplayer video game between the set-top box, the first thin client, and a second thin client, wherein the multiplayer video game includes consolidated video game content from the video game content stored in the video game content database;
displaying, by the set-top box, a first video game to a set-top box user through a first display that is coupled to the set-top box, the first video game utilizing the consolidated video game content;
obtaining, by the first thin client, first video game content for a second video game from the set-top box, the first video game content utilizing at least a portion of the consolidated video game content, the first thin client being located in a second room of the household;
displaying, by the first thin client, the second video game to a first thin client user through a second display that is coupled to the first thin client, the second video game utilizing at least a portion of the first video game content;
obtaining, by the second thin client, second video game content for a third video game from the set-top box, the second video game content utilizing at least a portion of the consolidated video game content, the second thin client being located in a third room of the household, the set-top box, the first thin client, and the second thin client being coupled to each other by a local area network and the first video game, the second video game, and the third video game being part of a multiplayer video game;
displaying, by the second thin client, the third video game to a second thin client user through a third display that is coupled to the second thin client, the third video game utilizing at least a portion of the second video game content;
receiving, by the set-top box, first coordination data for the first video game content from the first thin client and second coordination data for the second video game content from the second thin client;
updating, by the set-top box, the consolidated video game content based on the first coordination data and the second coordination data;
displaying, by the set-top box, the updated consolidated video game content to the set-top box user through the first display; and
forwarding, by the set-top box, the first coordination data to the second thin client and the second coordination data to the first thin client to enable execution of the multiplayer video game by the set-top box, the first thin client, and the second thin client.

2. The method according to claim 1, further including:
receiving, by the set-top box, a video game content demand for the first video game content from the first thin client;
determining, by the set-top box, whether the first video game content for the video game content demand is stored in the video game content database; and
providing, by the set-top box, the first video game content for the video game content demand to the first thin client, when it is determined that the first video game content for the video game content demand is stored in the video game content database.

3. The method according to claim 2, further including:
obtaining, by the set-top box, the first video game content for the video game content demand from at least one of the plurality of video game content providers and providing, by the set-top box, the obtained video game content to the first thin client, when it is determined that the first video game content for the video game content demand is not stored in the video game content database.

4. The method according to claim 1, wherein the local area network includes coaxial cable, the first thin client obtains the first video game content through the coaxial cable, and the second thin client obtains the second video game content through the coaxial cable.

5. A method comprising:
obtaining, by a set-top box, video game content from a plurality of remote video game content providers, the set-top box being located in a first room of a household;

storing, by the set-top box, the video game content from the plurality of remote video game content providers in a video game content database of the set-top box;

displaying, by the set-top box, a first video game to a set-top box user through a first display that is coupled to the set-top box, the first video game utilizing consolidated video game content stored in the video game content database, the consolidated video game content being part of a multiplayer video game between the set-top box, a first thin client, and a second thin client;

receiving, by the set-top box, a video game content demand for a second video game from the first thin client, the first video game utilizing at least a portion of the consolidated video game content, the first thin client being located in a second room of the household;

determining, by the set-top box, whether first video game content for the video game content demand is stored in the video game content database;

providing, by the set-top box, the first video game content for the video game content demand to the first thin client, when it is determined that the video game content for the video game content demand is stored in the video game content database;

obtaining, by the set-top box, the first video game content for the video game content demand from at least one of the plurality of video game content providers and providing, by the set-top box, the obtained video game content to the first thin client, when it is determined that the first video game content for the video game content demand is not stored in the video game content database;

providing, by the set-top box, second video game content for a third video game to the second thin client being located in a third room of the household, the second video game content utilizing at least a portion of the consolidated video game content, the set-top box, the first thin client, and the second thin client being coupled to each other through a local area network and the first video game, the second video game, and the third video game being part of the multiplayer video game;

receiving, by the set-top box, first coordination data for the second video game from the first thin client and second coordination data for the third video game from the second thin client;

updating, by the set-top box, the consolidated video game content based on the first coordination data and the second coordination data;

displaying, by the set-top box, the updated consolidated video game content to the set-top box user through the first display; and forwarding, by the set-top box, the first coordination data to the second thin client and the second coordination data to the first thin client to enable execution of the multiplayer video game by the first thin client and the second thin client.

6. The method according to claim 5, further including:
displaying, by the first thin client, the second video game to a first thin client user through a second display that is coupled to the first thin client the second video game utilizing at least a portion of the consolidated video game content.

7. The method according to claim 5, wherein the local area network includes coaxial cable, and the first thin client obtains the first video game content for through the coaxial cable.

8. A method comprising:
obtaining, by a set-top box, video game content from a plurality of remote video game content providers, the set-top box being located in a first room of a household;

storing, by the set-top box, the video game content from the plurality of remote video game content providers in a video game content database of the set-top box;

displaying, by the set-top box, a multiplayer video game to a set-top box user through a first display that is coupled to the set-top box, the multiplayer video game displayed by the set-top box being between the set-top box, a first thin client, and second thin client and utilizing consolidated video game content stored in the video game content database;

obtaining, by the first thin client, first video game content for the multiplayer video game from the set-top box, the first video game content utilizing at least a portion of the consolidated video game content, the first thin client being located in a second room of the household;

displaying, by the first thin client, the multiplayer video game to a first thin client user through a second display that is coupled to the first thin client, the multiplayer video game displayed by the first thin client utilizing at least a portion of the first video game content obtained by the first thin client;

obtaining, by a second thin client, second video game content for the multiplayer video game from the set-top box, the second video game content utilizing at least a portion of the consolidated video game content, the second thin client being located in a third room of the household, the set-top box, the first thin client, and the second thin client being coupled to each other through a local area network;

displaying, by the second thin client, the multiplayer video game to a second thin client user through a third display that is coupled to the second thin client, the multiplayer video game displayed by the second thin client utilizing at least a portion of the second video game content obtained by the second thin client;

receiving, by the set-top box, first coordination data for the multiplayer video game from the first thin client and second coordination data for the multiplayer video game from the second thin client;

updating, by the set-top box, the consolidated video game content based on the first coordination data and the second coordination data;

displaying, by the set-top box, the updated consolidated video game content to the set-top box user through the first display; and forwarding, by the set-top box, the first coordination data to the second thin client and the second coordination data to the first thin client to enable execution of the multiplayer video game by the set-top box, the first thin client, and the second thin client.

9. The method according to claim 8, further including:
receiving, by the set-top box, a video game content demand for the multiplayer video game from the first thin client;

determining, by the set-top box, whether video game content for the video game content demand is stored in the video game content database; and providing, by the set-top box, the video game content for the video game content demand to the first thin client, when it is determined that the video game content for the video game content demand is stored in the video game content database.

10. The method according to claim 9, further including:

obtaining, by the set-top box, the video game content for the video game content demand from at least one of the plurality of video game content providers and providing, by the set-top box, the obtained video game content to the first thin client, when it is determined that the video game content for the video game content demand is not stored in the video game content database.

11. The method according to claim 8, wherein the local area network includes coaxial cable, and the first thin client obtains the first video game content for the multiplayer video game through the coaxial cable and second thin client obtains the second video game content for the multiplayer video game through the coaxial cable.

12. The method according to claim 1, wherein the consolidated video game content for the first video game includes programming data to create the first video game on the set-top box, the first video game content for the second video game includes programming data to create the second video game on the first thin client, and the second video game content for the third video game includes programming data to create the third video game on the second thin client.

13. The method according to claim 1, wherein the consolidated video game content, the first video game content, and the second video game content include configuration data for the multiplayer video game.

14. The method according to claim 1, wherein the consolidated video game content, the first video game content, and the second video game content include media for the multiplayer video game.

15. The method according to claim 8, wherein the consolidated video game content for the multiplayer video game includes programming data, configuration data, and media to create the multiplayer video game on the set-top box, the first thin client, and the second thin client.

* * * * *